US011770036B2

(12) United States Patent
Shih et al.

(10) Patent No.: US 11,770,036 B2
(45) Date of Patent: Sep. 26, 2023

(54) SYNCHRONOUS RELUCTANCE MOTOR AND ELECTRICAL PRODUCT

(71) Applicant: Nidec Corporation, Kyoto (JP)

(72) Inventors: Pei-Chun Shih, Taipei (TW); Yu-Wei Hsu, Taipei (TW); Sheng-Chan Yen, Taipei (TW); Ta-Yin Luo, Taipei (TW); Hsin-Nan Lin, Taipei (TW); Guo-Jhih Yan, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/560,478

(22) Filed: Dec. 23, 2021

(65) Prior Publication Data

US 2022/0209595 A1 Jun. 30, 2022

(30) Foreign Application Priority Data

Dec. 25, 2020 (CN) .......................... 202011560082.7

(51) Int. Cl.
*H02K 1/24* (2006.01)
*H02K 19/10* (2006.01)

(52) U.S. Cl.
CPC ........... *H02K 1/246* (2013.01); *H02K 19/103* (2013.01); *H02K 1/24* (2013.01)

(58) Field of Classification Search
CPC ........... H02K 1/20; H02K 1/24; H02K 1/246; H02K 19/00
See application file for complete search history.

(56) References Cited

U.S. PATENT DOCUMENTS

| 2003/0173861 | A1 | 9/2003 | Kawaguchi et al. |
| 2017/0237307 | A1* | 8/2017 | Gontermann .......... H02K 19/14 310/162 |
| 2019/0207441 | A1* | 7/2019 | Takeuchi ................. H02K 1/22 |
| 2020/0136451 | A1 | 4/2020 | Zeichfüssl |
| 2020/0343798 | A1* | 10/2020 | Takeuchi ............... H02K 19/14 |
| 2022/0224210 | A1* | 7/2022 | Hu .......................... H02K 19/14 |
| 2022/0407372 | A1* | 12/2022 | Yen ........................ H02K 1/246 |

FOREIGN PATENT DOCUMENTS

| EP | 3 926 794 A1 | 12/2021 |
| EP | 3 926 795 A1 | 12/2021 |
| WO | 2018/172033 A1 | 9/2018 |
| WO | 2020/253194 A1 | 12/2020 |
| WO | 2020/253200 A1 | 12/2020 |

OTHER PUBLICATIONS

Official Communication issued in corresponding European Patent Application No. 21217354.6, dated May 24, 2022.
Ganesan et al., "Review on the evolution of technology advancements and applications of line-start synchronous machines", IET Electric Power Applications, vol. 13, No. 1, Oct. 29, 2018, pp. 1-16.
Hu et al., "Rotor Design and Optimization of the Three-phase Line-start Synchronous Reluctance Motor", 2019 22nd International Conference on Electrical Machines and Systems (ICEMS), Aug. 11, 2019, 6 pages.

* cited by examiner

*Primary Examiner* — Rashad H Johnson
(74) *Attorney, Agent, or Firm* — KEATING & BENNETT (57) ABSTRACT

A synchronous reluctance motor includes a rotor and a stator surrounding the rotor. The rotor includes a rotatable shaft and magnetic flux barrier layers arranged radially. One of the magnetic flux barrier layers closest to the stator is filled with a conductor, and one of the magnetic flux barrier layers closest to the rotating shaft is a void.

14 Claims, 8 Drawing Sheets

SYNCHRONOUS RELUCTANCE MOTOR AND ELECTRICAL PRODUCT

CROSS-REFERENCE TO RELATED APPLICATIONS

The present application claims priority under 35 U.S.C. § 119 to CN Patent Application No. 202011560082.7, filed on Dec. 25, 2020, the entire contents of which are hereby incorporated herein by reference.

FIELD OF THE INVENTION

Example embodiments of the present disclosure relate to the electromechanical field, in particular to a synchronous reluctance motor and an electrical product.

BACKGROUND

A synchronous reluctance motor that can be driven directly connected to a three-phase alternative current power source without a drive circuit is referred to as a DOL (Direct On Line) synchronous reluctance motor (SynRM). In order to drive the SynRM without the drive circuit, a conductor (an aluminum alloy) is filled in the magnetic flux barrier layers of the rotor of the SynRM.

It should be noted that the above introduction to the Background Art is only stated for the convenience of clear and complete description of the technical solution of the present disclosure, and to facilitate the understanding of those skilled in the art. It cannot be considered that the above technical solutions are well known to those skilled in the art just because these solutions are described in the Background Art section of the present disclosure.

The inventor discovered that if a conductor is filled in a magnetic flux barrier layer, although a starting torque can be increased, the efficiency is reduced for equilibrium. For example, if the conductor is filled in the magnetic flux barrier layer, when a motor is running, additional rotor current will be generated. As a result, although the starting torque is increased, the copper loss is also increased.

Figure 1:
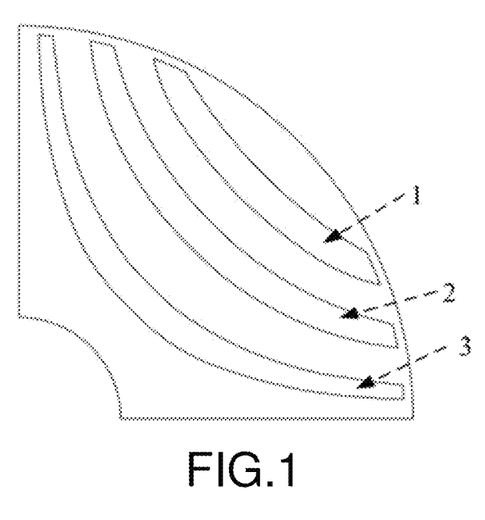
FIG. 1 is a schematic diagram of a rotor structure of an existing synchronous reluctance motor.

Taking a rotor having three magnetic flux barrier layers as an example, as shown in FIG. 1, when all the three magnetic flux barrier layers are filled with the conductor, the copper losses corresponding to the three magnetic flux barrier layers are as shown in Table 1. It can be seen from Table 1 that the copper loss corresponding to the magnetic flux barrier layer 3 closest to the shaft accounts for more than half.

TABLE 1

| Conductor position | Copper loss of rotor (%) |
| --- | --- |
| Magnetic flux barrier layer (barrier) 1 | 24.45 |
| Magnetic flux barrier layer (barrier) 2 | 22.27 |
| Magnetic flux barrier layer (barrier) 3 | 53.28 |

Figure 2:
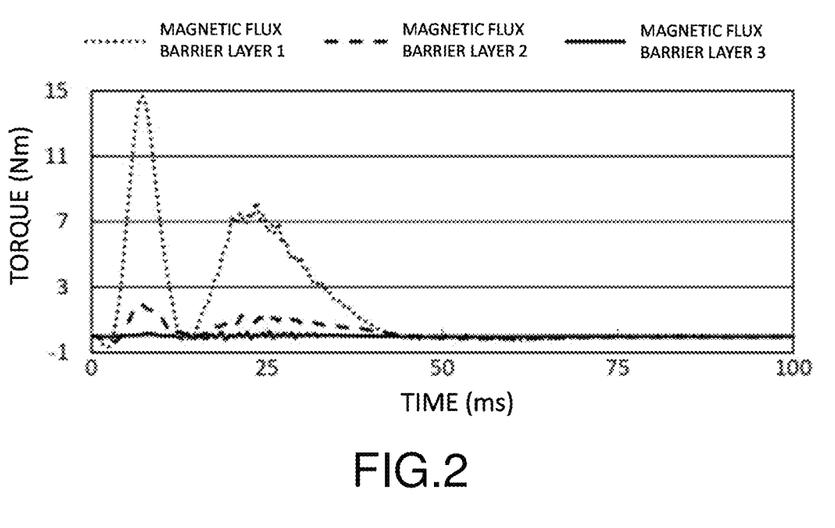
FIG. 2 is a schematic diagram of the starting torques corresponding to the three magnetic flux barrier layers of the rotor shown in FIG. 1.

In another aspect, when the conductor is filled in the three magnetic flux barrier layers, the starting torque of each magnetic flux barrier layer is as shown in FIG. 2. It can thus be seen that the starting torque of the magnetic flux barrier layer 1 closest to the stator is the maximum.

SUMMARY

According to an example embodiment of the present disclosure, a synchronous reluctance motor includes a rotor and a stator surrounding the rotor. The rotor includes a rotatable shaft and magnetic flux barrier layers arranged radially. One of the magnetic flux barrier layers closest to the stator is filled with a conductor, and one of the magnetic flux barrier layers closest to the rotating shaft is a void.

According to another example embodiment of the present disclosure, an electrical machine includes the aforementioned synchronous reluctance motor.

With reference to the following description and drawings, specific implementations of the present disclosure are disclosed in detail, indicating the ways in which the principles of the present disclosure can be adopted. It should be understood that the scope of the implementations of the present disclosure is not thus limited. Within the scope of the spirits and clauses of the appended claims, the implementations of the present disclosure include many changes, modifications and equivalents.

The above and other elements, features, steps, characteristics and advantages of the present disclosure will become more apparent from the following detailed description of the example embodiments with reference to the attached drawings.

BRIEF DESCRIPTION OF THE DRAWINGS

The included drawings are used to provide a further understanding of the example embodiments of the present disclosure, and they constitute a part of the specification, are used to illustrate the implementations of the present disclosure, and explain the principles of the present disclosure together with the text description. The drawings in the following description are merely some example embodiments of the present disclosure. For those of ordinary skill in the art, other drawings can also be obtained according to these drawings without creative efforts.

DETAILED DESCRIPTION

The foregoing and other features of the present disclosure will become apparent through the following specification with reference to the drawings. In the specification and the drawings, specific implementations of the present disclosure are specifically disclosed, indicating some of the implementations in which the principles of the present disclosure can be adopted. It should be understood that the present disclosure is not limited to the described implementations. On the contrary, the present disclosure includes all modifications, variations and equivalents falling within the scope of the appended claims.

In the example embodiments of the present disclosure, the terms "first", "second" and the like are used to distinguish different elements from names, but they do not indicate the spatial arrangement or temporal order or the like of these elements, and these elements should not be limited by these terms. The term "and/or" includes any and all combinations of one or more of the associatively listed terms. The terms "comprise", "include", "have" and the like refer to the presence of the stated features, elements, components or assemblies, but do not exclude the presence or addition of one or more other features, elements, components or assemblies.

In the example embodiments of the present disclosure, the singular forms "a/an", "this" and the like may include plural forms, which should be broadly understood as "a kind" or "a type", rather than being limited to the meaning of "one". In addition, the term "the" should be understood as including both singular and plural forms, unless clearly stated otherwise in the context. In addition, the term "according to" should be understood as "at least in part according to . . . ", and the term "based on" should be understood as "at least in part based on . . . ", unless clearly stated otherwise in the context.

In the following description of the example embodiments of the present disclosure, for the convenience of description, the direction parallel to the direction extending along the central axis O of the synchronous reluctance motor is referred to as "axial"; the radius direction centered on the central axis O is referred to as "radial"; the direction close to the central axis O is referred to as "radial inner side" or "inner side"; and the direction away from the central axis O is referred to as "radial outer side" or "outer side". It is worth noting that these are only for the convenience of description, and do not limit the orientation of the synchronous reluctance motor in use and manufacture.

Implementations of example embodiments of the present disclosure will be illustrated below with reference to the drawings.

Example embodiments of the present disclosure provide a synchronous reluctance motor.

Figure 3:
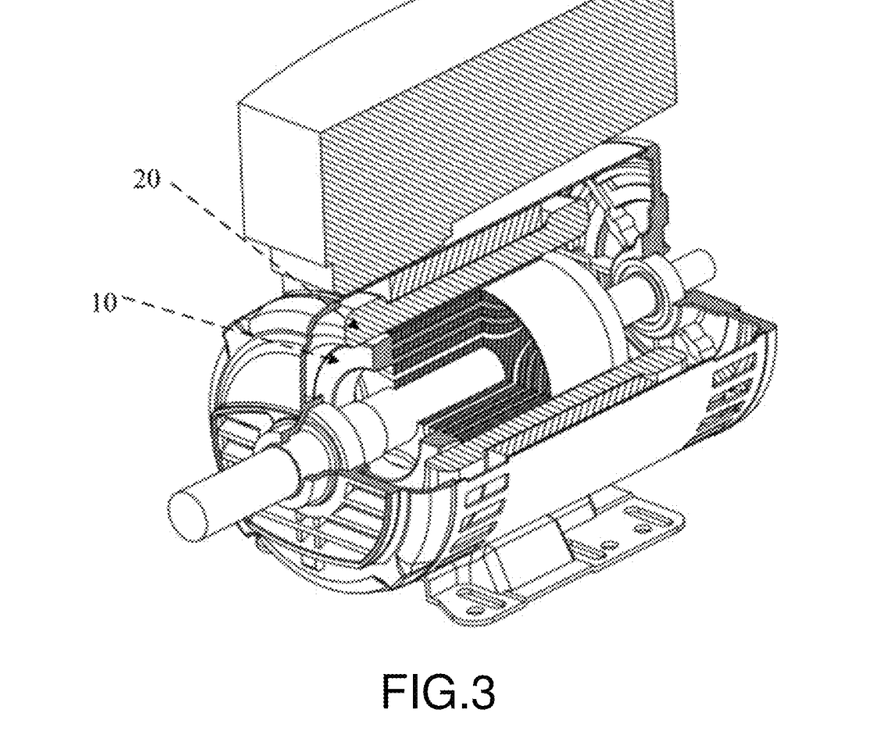
FIG. 3 is a schematic diagram of an example of a synchronous reluctance motor according to an example embodiment of the present disclosure.

FIG. 3 is a schematic diagram of an example of a synchronous reluctance motor according to an example embodiment of the present disclosure. As shown in FIG. 3, the synchronous reluctance motor according to the example embodiment of the present disclosure has a rotor 10 and a stator 20 surrounding the rotor 10. In addition, the synchronous reluctance motor further includes other constitutions such as a shaft, a bearing, an enclosure and the like, which can make references to related arts.

In the example embodiment of the present disclosure, the rotator 10 has a plurality of magnetic flux barrier layers arranged radially, the one (i.e., the magnetic flux barrier layer at the radial outmost) of the plurality of magnetic flux barrier layers closest to the stator is filled with a conductor, and the one (i.e., the magnetic flux barrier layer at the radial innermost) closest to the rotating shaft is a void.

According to the synchronous reluctance motor (DOL-SynRM) in the example embodiment of the present disclosure, the magnetic flux barrier layer closest to the stator is filled with the conductor, and the magnetic flux barrier layer closest to the shaft is the void. Other magnetic flux barrier layers are selected to be filled with a conductor or serve as a void according to the required starting torque. Therefore, both the starting torque and the efficiency of the DOL-SynRM are taken into account.

In some example embodiments, the number of the magnetic flux barrier layers is 2N, N>1, and more than N of the magnetic flux barrier layers close to the stator are filled with a conductor. In some example embodiments, at least a part of the (N+1)th to (2N−1)th of the plurality of magnetic flux barrier layers closest to the stator side are filled with a conductor.

N=2 is taken as an example, i.e., the rotor 10 has four magnetic flux barrier layers.

Figure 4:
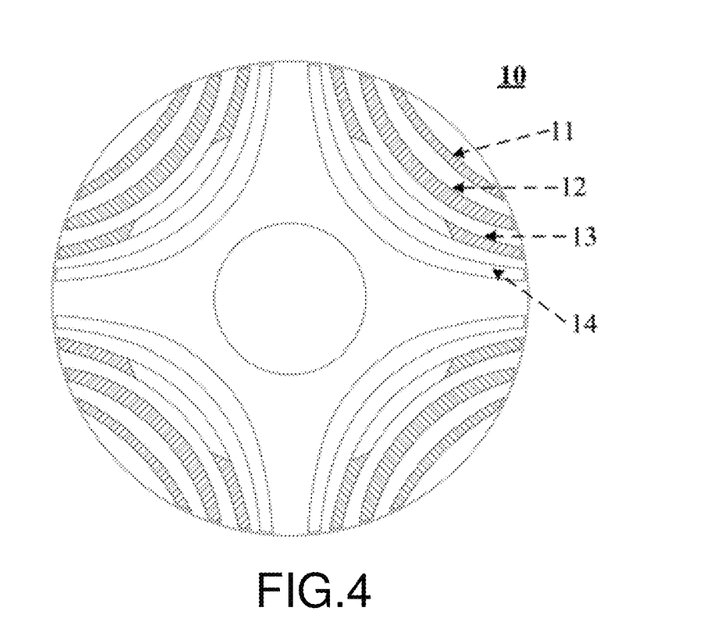
FIG. 4 is a schematic diagram of an example of a rotor including four magnetic flux barrier layers according to an example embodiment of the present disclosure.

FIG. 4 is a schematic diagram of an example of the rotor 10 having four magnetic flux barrier layers 11 to 14. As shown in FIG. 4, in this example, counting from the stator side, the first and second (i.e., N) magnetic flux barrier layers 11 and 12 are filled with a conductor, a part of the third magnetic flux barrier layer 13 is filled with the conductor, and the fourth magnetic flux barrier layer 14 is a void. From this design, both the starting torque and the efficiency of the DOL-SynRM are taken into account.

Figure 5:
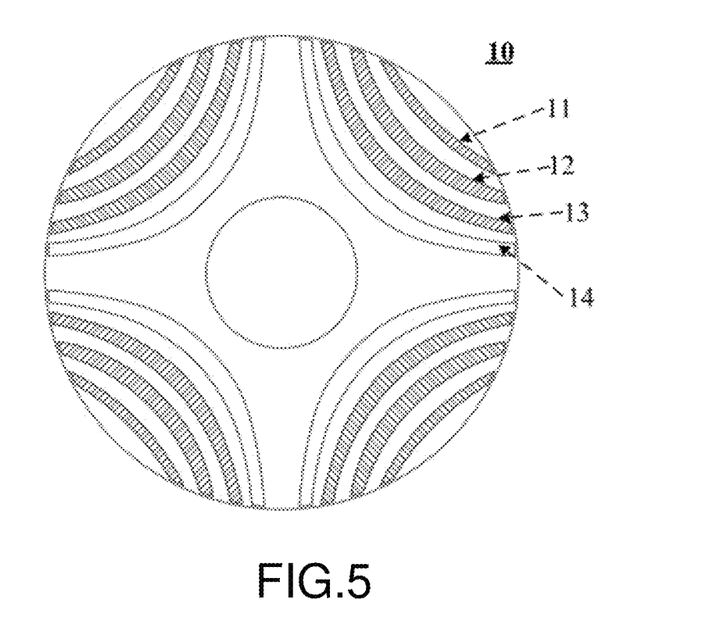
FIG. 5 is a schematic diagram of another example of the rotor including four magnetic flux barrier layers according to an example embodiment of the present disclosure.

FIG. 5 is a schematic diagram of another example of the rotor 10 having four magnetic flux barrier layers 11 to 14. As shown in FIG. 5, in this example, counting from the stator side, the first and second (i.e., N) magnetic flux barrier layers 11 and are filled with a conductor, the entire part of the third magnetic flux barrier layer 13 is filled with the conductor, and the fourth magnetic flux barrier layer 14 is a void. From this design, both the starting torque and the efficiency of the DOL-SynRM are also taken into account.

In some example embodiments, the number of the magnetic flux barrier layers is 2N+1, N=1, i.e., the rotor 10 has three magnetic flux barrier layers, and N+1 of the magnetic flux barrier layers close to the stator are filled with a conductor.

Figure 6:
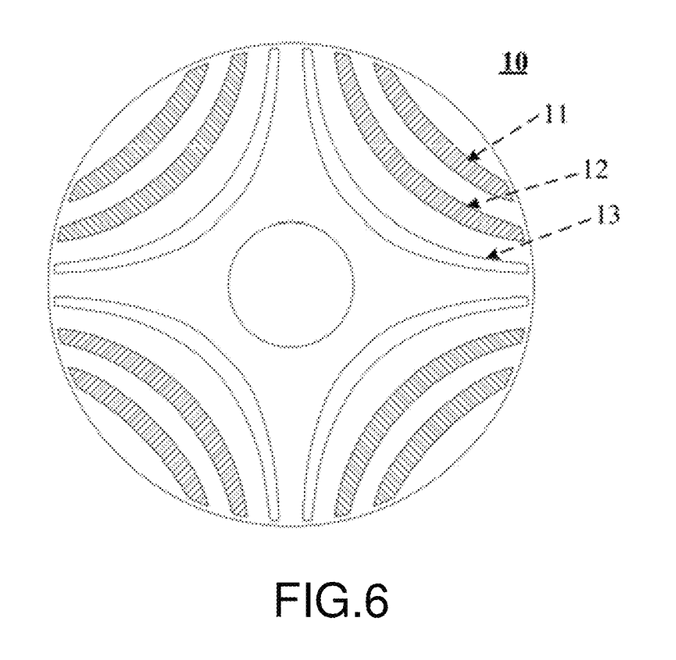
FIG. 6 is a schematic diagram of an example of a rotor including three magnetic flux barrier layers according to an example embodiment of the present disclosure.

FIG. 6 is a schematic diagram of an example of the rotor 10 having three magnetic flux barrier layers 11 to 13. As shown in FIG. 6, in this example, counting from the stator side, the first and second (i.e., N+1) magnetic flux barrier layers 11 and 12 are filled with a conductor, and the third magnetic flux barrier layer 13 is a void. From this design, both the starting torque and the efficiency of the DOL-SynRM are also taken into account.

In some example embodiments, the number of the magnetic flux barrier layers is 2N+1, N>1, and more than N+1 of the magnetic flux barrier layers close to the stator are filled with a conductor. In some example embodiments, at least a part of the (N+2)th to 2Nth of the plurality of magnetic flux barrier layers closet to the stator side are filled with a conductor or no conductor.

N=2 is taken as an example, i.e., the rotor 10 has five magnetic flux barrier layers.

Figure 7:
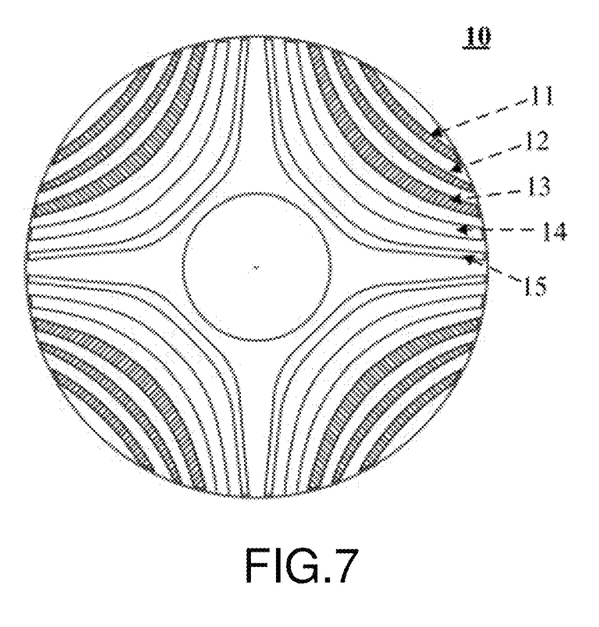
FIG. 7 is a schematic diagram of an example of a rotor including five magnetic flux barrier layers according to an example embodiment of the present disclosure.

FIG. 7 is a schematic diagram of an example of the rotor 10 having five magnetic flux barrier layers 11 to 15. As shown in FIG. 7, in this example, counting from the stator side, the first, second and third (i.e., N+1) magnetic flux barrier layers 11, 12 and 13 are filled with a conductor, and the fourth and fifth magnetic flux barrier layers 14 and 15 are voids. That is, the (N+2)th to 2Nth (fourth) magnetic flux barrier layer(s) is/are filled with no conductor. From this design, both the starting torque and the efficiency of the DOL-SynRM are also taken into account.

Figure 8:
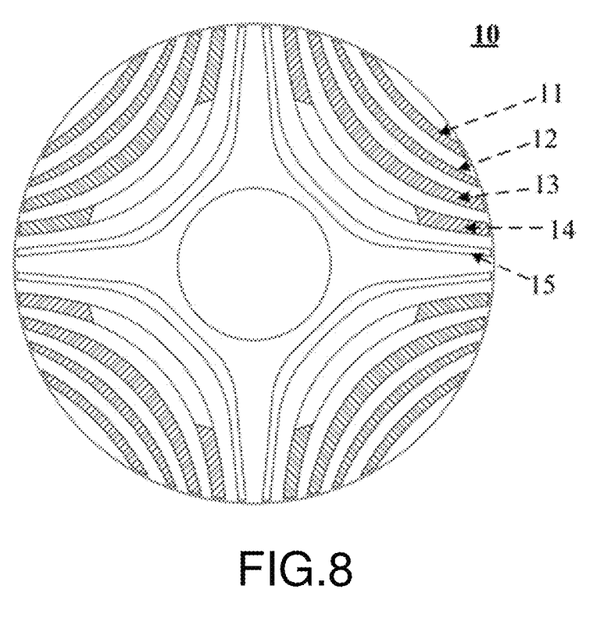
FIG. 8 is a schematic diagram of another example of the rotor including five magnetic flux barrier layers according to an example embodiment of the present disclosure.

FIG. 8 is a schematic diagram of another example of the rotor 10 having five magnetic flux barrier layers 11 to 15. As shown in FIG. 8, in this example, counting from the stator side, the first, second and third (i.e., N+1) magnetic flux barrier layers 11, 12 and 13 are filled with a conductor, a part of the fourth (i.e., N+2 to 2N) magnetic flux barrier layer 14 is filled with the conductor, and the fifth magnetic flux barrier layer 15 is a void. From this design, both the starting torque and the efficiency of the DOL-SynRM are also taken into account.

Figure 9:
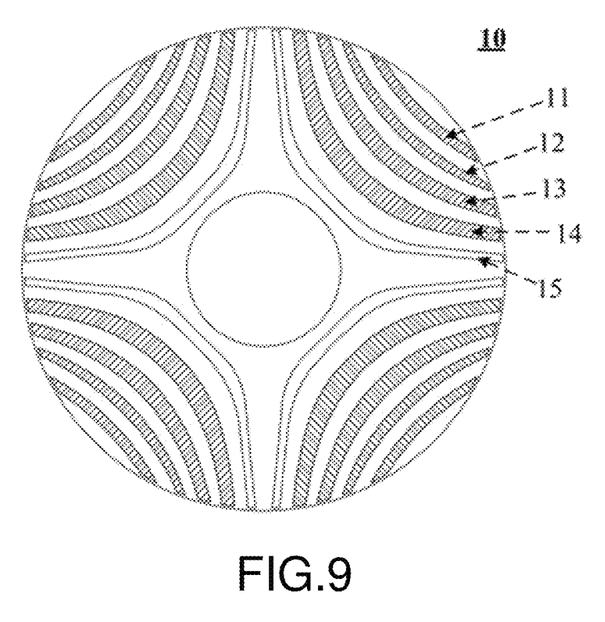
FIG. 9 is a schematic diagram of still another example of the rotor including five magnetic flux barrier layers according to an example embodiment of the present disclosure.

FIG. 9 is a schematic diagram of still another example of the rotor 10 having five magnetic flux barrier layers 11 to 15. As shown in FIG. 9, in this example, counting from the stator side, the first, second, third and fourth magnetic flux barrier layers 11, 12, 13 and 14 are filled with a conductor, and the fifth magnetic flux barrier layer 15 is a void. That is, the N+1 (three) magnetic flux barrier layers 11, 12, 13 from the stator side are filled with the conductor, and the entire part of the (N+2)th to 2Nth (fourth) magnetic flux barrier layer(s) is/are also filled with the conductor. From this design, both the starting torque and the efficiency of the DOL-SynRM are also taken into account.

In the example embodiment of the present disclosure, the conductor above may be an aluminum alloy, but the present disclosure is not limited thereto.

It is worth noting that only the structure of the synchronous reluctance motor related to the present disclosure is described above. The synchronous reluctance motor may also include other constitutions. Reference may be made to related arts for details, and the description is omitted here. In addition, parts not shown in FIGS. 1 to 9 may also be added, or one or more parts in FIGS. 1 to 9 may be reduced. For other structures and structures of the synchronous reluctance motor, reference may be made to related technologies, and the description is omitted here.

According to the synchronous reluctance motor (DOL-SynRM) in the example embodiment of the present disclosure, the magnetic flux barrier layer closest to the stator is filled with the conductor, and the magnetic flux barrier layer closest to the shaft is the void. Other magnetic flux barrier layers are selected to be filled with a conductor or serve as a void according to the required starting torque. Therefore, both the starting torque and the efficiency of the DOL-SynRM are taken into account.

The example embodiment of the second aspect of the present disclosure provides an electrical product, which has the synchronous reluctance motor as described by the example embodiments of the first aspect. Since in the example embodiments of the first aspect, the structure of the synchronous reluctance motor has been described in detail, the content of which is incorporated herein, and the description is omitted here.

In the example embodiments of the present disclosure, for other structures of the electrical product, reference may be made to related arts, and the description is omitted here.

The present disclosure is described above in conjunction with specific implementations, but it should be clear to those skilled in the art that these descriptions are all exemplary, instead of limit to the protection scope of the present disclosure. Those skilled in the art can make various variations and modifications according to the spirits and principle of the present disclosure, which are also within the scope of the present disclosure.

Preferred implementations of the present disclosure are described above with reference to the drawings. Many features and advantages of these implementations are clear according to the detailed specification, thus the appended claims are intended to cover all these features and advantages of these implementations falling within the real spirits and scope thereof. In addition, since those skilled in the art can readily conceive of many modifications and changes, the implementations of the present disclosure are not limited to the precise structures and operations illustrated and described, but can encompass all suitable modifications and equivalents falling within their scope.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A synchronous reluctance motor, comprising:
   a rotor; and
   a stator surrounding the rotor; wherein
   the rotor includes a rotatable shaft and magnetic flux barrier layers arranged radially;
   one of the magnetic flux barrier layers closest to the stator is filled with a conductor, and one of the magnetic flux barrier layers closest to the rotating shaft is a void;
   a total number of the magnetic flux barrier layers 2N+1, where N>1;
   more than N+1 of the magnetic flux barrier layers adjacent to the stator are filled with conductors; and
   at least a portion of the (N+2)th to 2Nth of the magnetic flux barrier layers adjacent to the stator are filled with the conductors or voids which do not include any of the conductors.

2. The synchronous reluctance motor according to claim 1, wherein
   a total number of the magnetic flux barrier layers is 2N, where N>1; and
   more than N of the magnetic flux barrier layers which are adjacent to the stator are filled with conductors.

3. The synchronous reluctance motor according to claim 2, wherein
   at least a portion of the (N+1)th to (2N−1)th of the magnetic flux barrier layers which are adjacent to the stator side are filled with the conductors.

4. The synchronous reluctance motor according to claim 1, wherein a total number of the magnetic flux barrier layers is 2N+1, where N=1; and
   N+1 of the magnetic flux barrier layers adjacent to the stator are filled with conductors.

5. The synchronous reluctance motor according to claim 1, wherein the conductors are made of an aluminum alloy.

6. An electrical product comprising the synchronous reluctance motor according to claim 1.

7. A synchronous reluctance motor, comprising:
   a rotor; and
   a stator surrounding the rotor; wherein
   the rotor includes a rotatable shaft and magnetic flux barrier layers arranged radially;
   one of the magnetic flux barrier layers closest to the stator is filled with a conductor, and one of the magnetic flux barrier layers closest to the rotating shaft is a void; and
   each of the magnetic flux barrier layers is a single continuous magnetic flux barrier.

8. The synchronous reluctance motor according to claim 7, wherein
  a total number of the magnetic flux barrier layers is 2N, where N>1; and
  more than N of the magnetic flux barrier layers which are adjacent to the stator are filled with conductors.

9. The synchronous reluctance motor according to claim 8, wherein
  at least a portion of the (N+1)th to (2N−1)th of the magnetic flux barrier layers which are adjacent to the stator side are filled with the conductors.

10. The synchronous reluctance motor according to claim 7, wherein
  a total number of the magnetic flux barrier layers is 2N+1, where N=1; and
  N+1 of the magnetic flux barrier layers adjacent to the stator are filled with conductors.

11. The synchronous reluctance motor according to claim 7, wherein
  a total number of the magnetic flux barrier layers is 2N+1, where N>1; and
  more than N+1 of the magnetic flux barrier layers adjacent to the stator are filled with conductors.

12. The synchronous reluctance motor according to claim 11, wherein
  at least a portion of the (N+2)th to 2Nth of the magnetic flux barrier layers adjacent the stator are filled with both the conductors or voids which do not include any of the conductors.

13. The synchronous reluctance motor according to claim 7, wherein the conductors are made of an aluminum alloy.

14. An electrical product comprising the synchronous reluctance motor according to claim 7.

* * * * *